(12) United States Patent
Adams et al.

(10) Patent No.: US 8,690,512 B2
(45) Date of Patent: *Apr. 8, 2014

(54) APPARATUS FOR FREIGHT CONTAINER LOADING

(71) Applicant: SA Recycling LLC, Anaheim, CA (US)

(72) Inventors: George Adams, Orange, CA (US);
Terry Scot Adams, Villa Park, CA (US);
Michael J. Adams, Yorba Linda, CA (US)

(73) Assignee: SA Recycling LLC, Orange, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/788,465

(22) Filed: Mar. 7, 2013

(65) Prior Publication Data
US 2013/0195589 A1 Aug. 1, 2013

Related U.S. Application Data

(63) Continuation of application No. 12/882,031, filed on Sep. 14, 2010, which is a continuation of application No. 11/736,434, filed on Apr. 17, 2007, now Pat. No. 7,837,428.

(60) Provisional application No. 60/893,022, filed on Mar. 5, 2007.

(51) Int. Cl.
*B65F 9/00* (2006.01)

(52) U.S. Cl.
USPC .......................................... 414/400; 414/389

(58) Field of Classification Search
USPC ......... 414/333, 334, 336, 373, 376, 389, 397, 414/400, 401, 402, 572, 585, 809, 399, 414/409; 220/1.5; 280/769; 296/182.1
See application file for complete search history.

(56) References Cited

U.S. PATENT DOCUMENTS 2,514,752 A 7/1950 Brannon
2,543,295 A 2/1951 McGregor et al.
(Continued)

FOREIGN PATENT DOCUMENTS

DE 19740156 3/1999
DE 10302472 A1 8/2004
(Continued)

OTHER PUBLICATIONS

Orth, C.L., Cargo Container Insert Program (Final Report) Report Number: MERADCOM-2272, Apr. 1979, 45pp.
International Preliminary Examining Authority, International Preliminary Report on Patentability for PCT Application No. PCT/US08/55922, mailed Aug. 27, 2009.
International Search Authority, International Search Report and Written Opinion for PCT Application No. PCT/US12/50968, mail date Nov. 6, 2012.
International Searching Authority, International Search Report and Written Opinion for PCT Application No. PCT/ US2008/055922, mail date Aug. 7, 2008.

*Primary Examiner* — Saul Rodriguez
*Assistant Examiner* — Glenn Myers
(74) *Attorney, Agent, or Firm* — SoCal IP Law Group LLP; Steven C. Sereboff

(57) ABSTRACT

Disclosed are apparatuses and methods for use thereof for loading bulk material into freight containers. One apparatus comprises a hopper configured to receive bulk material that is sized and shaped to be at least partially enclosable by a container to occupy a substantial volume of the container and a ram. The ram comprises a plate and a driver configured to move the plate from a back end of the hopper to an open end of the hopper to expel material into a container. Another apparatus comprises a hopper configured to receive bulk material that is sized and shaped to be at least partially enclosable by a container to occupy a substantial volume of the container and a reciprocating conveyor floor system. Optionally, the apparatuses further include a stand and/or collapsible legs to further support the hopper.

13 Claims, 5 Drawing Sheets

(56) References Cited

U.S. PATENT DOCUMENTS

| | | |
|---|---|---|
| 2,656,942 A | 10/1953 | Helms |
| 2,663,439 A | 12/1953 | Phelps |
| 2,711,835 A | 6/1955 | Kappen |
| 2,788,136 A | 4/1957 | Hebert et al. |
| 2,802,583 A | 8/1957 | Dansereau |
| 2,812,868 A | 11/1957 | Crile |
| 2,849,129 A | 8/1958 | Likens |
| 2,856,086 A | 10/1958 | Balbi |
| 3,040,914 A | 6/1962 | Johnson et al. |
| 3,169,652 A | 2/1965 | Ewell |
| 3,175,708 A | 3/1965 | Felts |
| 3,220,586 A | 11/1965 | Gollnick |
| 3,252,602 A | 5/1966 | Bowles |
| 3,273,728 A | 9/1966 | Kelso |
| 3,285,440 A | 11/1966 | Kersey et al. |
| 3,285,448 A | 11/1966 | Palm, Sr. et al. |
| 3,313,435 A | 4/1967 | Welk |
| 3,456,825 A | 7/1969 | Lacoe |
| 3,506,136 A | 4/1970 | Brandow et al. |
| 3,550,752 A | 12/1970 | Gregor |
| 3,667,635 A | 6/1972 | Hackney |
| 3,688,926 A | 9/1972 | Stefanelli |
| 3,727,370 A | 4/1973 | Lassig |
| 3,727,777 A | 4/1973 | Hanson |
| 3,779,404 A | 12/1973 | McWilliams |
| 3,780,893 A | 12/1973 | Grosshauser et al. |
| 3,815,764 A | 6/1974 | Gilfillan et al. |
| 3,819,068 A | 6/1974 | Weir |
| 3,820,670 A | 6/1974 | Pizzo et al. |
| 3,827,585 A | 8/1974 | McWilliams |
| 3,837,510 A | 9/1974 | McWilliams |
| 3,866,769 A | 2/1975 | Morey et al. |
| 3,888,366 A | 6/1975 | Prahst |
| 3,907,133 A | 9/1975 | Brooks |
| 3,938,678 A | 2/1976 | Kern |
| 3,952,887 A | 4/1976 | Lutz |
| 3,958,701 A | 5/1976 | Yatagai et al. |
| 3,993,203 A | 11/1976 | Bartley |
| 4,011,957 A | 3/1977 | Bendtsen et al. |
| 4,016,991 A | 4/1977 | Oldford |
| 4,044,899 A | 8/1977 | Booher |
| 4,054,226 A | 10/1977 | Bjelland et al. |
| 4,103,789 A | 8/1978 | Andrews et al. |
| 4,125,196 A | 11/1978 | Liberman et al. |
| 4,133,438 A | 1/1979 | Liberman et al. |
| 4,171,178 A | 10/1979 | Birkenfeld et al. |
| 4,216,927 A | 8/1980 | Byrd |
| 4,231,695 A | 11/1980 | Weston |
| 4,236,630 A | 12/1980 | Sander et al. |
| 4,247,245 A | 1/1981 | Stolt et al. |
| 4,260,317 A | 4/1981 | Martin et al. |
| 4,306,830 A | 12/1981 | Le Duc |
| 4,313,708 A | 2/1982 | Tiliakos |
| 4,352,624 A | 10/1982 | Matsumoto |
| 4,475,454 A | 10/1984 | Sendl et al. |
| 4,522,556 A | 6/1985 | Shapiro |
| 4,537,554 A | 8/1985 | Collins |
| 4,557,400 A | 12/1985 | Clarke |
| 4,570,417 A | 2/1986 | Herr |
| 4,611,708 A | 9/1986 | Foster |
| 4,677,909 A | 7/1987 | Beesley et al. |
| 4,699,337 A | 10/1987 | Lewis |
| 4,704,063 A | 11/1987 | Updike et al. |
| 4,768,916 A | 9/1988 | Gearin et al. |
| 4,832,559 A | 5/1989 | Gebbardt |
| 4,917,557 A | 4/1990 | Kato |
| 4,919,582 A | 4/1990 | Bates et al. |
| 4,923,356 A | 5/1990 | Foster |
| 4,957,407 A | 9/1990 | Gearin |
| 5,009,560 A | 4/1991 | Ruder et al. |
| 5,015,141 A | 5/1991 | Ferrence |
| 5,017,076 A | 5/1991 | Condrey |
| 5,040,938 A | 8/1991 | Gearin et al. |
| 5,044,870 A | 9/1991 | Foster |
| 5,125,424 A | 6/1992 | Eisen et al. |
| 5,186,596 A | 2/1993 | Boucher et al. |
| 5,193,700 A | 3/1993 | Lyman |
| 5,193,968 A | 3/1993 | Hicks |
| 5,314,290 A | 5/1994 | Lutz et al. |
| 5,322,350 A | 6/1994 | Hinson |
| 5,322,411 A | 6/1994 | Elkin et al. |
| 5,324,158 A | 6/1994 | Shah et al. |
| 5,333,340 A | 8/1994 | Moseley |
| 5,346,352 A | 9/1994 | Ito |
| 5,403,142 A | 4/1995 | Stewart |
| 5,415,505 A | 5/1995 | Halpin et al. |
| 5,454,685 A | 10/1995 | Podd et al. |
| 5,527,147 A | 6/1996 | Hulls |
| 5,577,873 A | 11/1996 | Tanaka et al. |
| 5,645,390 A | 7/1997 | Filiberti et al. |
| 5,711,566 A | 1/1998 | Lesmeister et al. |
| 5,765,986 A | 6/1998 | Hulls |
| 5,810,186 A | 9/1998 | Lam et al. |
| 5,911,555 A | 6/1999 | Foster |
| 5,944,472 A | 8/1999 | Scofield |
| 5,971,185 A | 10/1999 | Schutz |
| 6,039,421 A | 3/2000 | Fulterer |
| 6,048,167 A | 4/2000 | Lesmeister et al. |
| 6,065,923 A | 5/2000 | Foster |
| 6,095,743 A | 8/2000 | Dudley |
| 6,109,854 A | 8/2000 | Thompson et al. |
| 6,138,557 A | 10/2000 | Brown et al. |
| 6,168,371 B1 | 1/2001 | Lesmeister et al. |
| 6,190,106 B1 | 2/2001 | Richardson et al. |
| 6,299,008 B1 | 10/2001 | Payne |
| 6,406,249 B1 | 6/2002 | McAdams et al. |
| 6,418,841 B1 | 7/2002 | Little et al. |
| 6,427,585 B1 | 8/2002 | Brown et al. |
| 6,450,753 B1 | 9/2002 | Hallstrom et al. |
| 6,484,862 B1 | 11/2002 | Gilmore et al. |
| 6,520,729 B1 | 2/2003 | Gibson |
| 6,575,686 B2 | 6/2003 | Hagenzieker |
| 6,663,335 B2 | 12/2003 | Benson et al. |
| 6,709,219 B2 | 3/2004 | Reed, III |
| 6,910,844 B2 | 6/2005 | Trescott |
| 7,172,382 B2 | 2/2007 | Frankel |
| 7,244,087 B2 | 7/2007 | Wilson et al. |
| 7,275,906 B1 | 10/2007 | Pool |
| 7,588,406 B2 | 9/2009 | Frankel |
| 7,695,235 B1 | 4/2010 | Rallis |
| 7,699,575 B2 | 4/2010 | Frankel |
| 7,837,428 B2 | 11/2010 | Adams |
| 7,841,823 B2 | 11/2010 | Sveum et al. |
| 7,866,932 B1 | 1/2011 | Pool |
| 2001/0023854 A1 | 9/2001 | Gearin et al. |
| 2003/0026678 A1 | 2/2003 | Sumpter |
| 2003/0175089 A1 | 9/2003 | Almind |
| 2004/0001749 A1 | 1/2004 | Vanberlo |
| 2004/0086363 A1 | 5/2004 | Rohr |
| 2004/0086367 A1 | 5/2004 | Isaacs |
| 2004/0151565 A1 | 8/2004 | Zaun et al. |
| 2004/0191038 A1 | 9/2004 | Lockamy et al. |
| 2005/0095096 A1 | 5/2005 | Curotto et al. |
| 2005/0191158 A1 | 9/2005 | Byrne |
| 2006/0045682 A1 | 3/2006 | Norris |
| 2006/0285949 A1 | 12/2006 | Frankel |
| 2007/0140819 A1 | 6/2007 | Piveteau et al. |
| 2007/0201971 A1 | 8/2007 | Meijer |
| 2009/0169349 A1 | 7/2009 | Reed |

FOREIGN PATENT DOCUMENTS

| | | |
|---|---|---|
| EP | 0021814 | 1/1983 |
| EP | 0056928 | 12/1985 |
| EP | 0462938 | 8/1994 |

(56) References Cited

FOREIGN PATENT DOCUMENTS

| | | |
|---|---|---|
| EP | 0867400 | 3/2000 |
| GB | 966227 A | 8/1964 |
| JP | 52-013271 | 2/1977 |
| JP | 59-026829 | 2/1984 |
| JP | 61221017 | 10/1986 |
| JP | 04-135523 | 5/1992 |
| JP | 07228356 A | 8/1995 |
| JP | 08040568 A | 2/1996 |
| WO | 99014137 | 3/1999 |
| WO | 03095338 | 11/2003 | too large to be properly transported using the conveyer belt, requiring the bulk material to be further shredded or otherwise reduced in size before being loaded. Moreover, it is not uncommon to have irregularly shaped pieces of material to impact with the sidewalls of the container while being loaded.

APPARATUS FOR FREIGHT CONTAINER LOADING

RELATED APPLICATIONS

This is a Continuation application which is based on U.S. Ser. No. 12/882,031, filed on Sep. 14, 2010; which is a continuation of U.S. Ser. No. 11/736,434, filed on Apr. 27, 2007, now U.S. Pat. No. 7,837,428, issued on Nov. 23, 2010; which claims benefit of U.S. Provisional Application No. 60/893,022, filed on Mar. 5, 2007.

BACKGROUND OF THE INVENTION

1. Field of the Invention

The present invention relates to methods and apparatuses for loading bulk material into containers. More particularly, the invention relates to methods for loading scrap metal and steel into freight containers, and apparatuses thereof.

2. Description of the Related Art

Efficiency and speed are important in the freighting industry. Decreasing the time necessary to load material into a freight container, transport the container, and unload the material from the container usually translates into greater profits for those involved in the process. One way the industry has increased efficiency has been to standardize the sizes of its freight containers, as defined by the ISO 668 standard. The use of standard sized freight containers allows tractor-trailers, ships, trains, and other freight carriers to quickly load and unload containers and to optimally utilize their available space. While freight containers come in several standard sizes, the most common sizes are the standard 40', the 40' high-cube, and the standard 20'. The minimum internal height of most ISO standard shipping containers is 7' 8½", while the minimum internal width is 7' 7¾".

The use of such standard internal minimum dimensions generally permits quick loading and unloading of standard sized pallets onto freight containers while maximizing the use of available space in the containers. Not all materials, however, are suitable for palletization. For instance, bulk material, such as scrap metal, generally should not be palletized because such material varies widely in shape. As a result, many pieces of the bulk material are too large to fit within a pallet and must be either loaded separately into the container or cut into smaller pieces. Even when the bulk material is small enough to fit within a pallet, the space in the pallet is generally severely underutilized because of the bulk material's irregular shape. Because of the problems associated with palletizing bulk material, other methods for loading bulk material into freight containers have been developed.

One method to load bulk into a freight container is to use a conveyer belt. In this way, bulk material is placed on a conveyer belt that leads from outside of the container, through a door in the container, and terminates at an opposite closed end of the container. When the material reaches the end of the conveyer belt, it falls off the belt and is thus placed in the container. There are several problems with this method. First, the size of the conveyer, coupled with the irregular shaped bulk material, makes it difficult to utilize a high percentage of the available space in the container; there simply is not enough clearance in the container to permit stacking bulk material beyond a certain height. Also, the size of the bulk material, particularly Heavy Melting Scrap ("HMS"), is often too large to be properly transported using the conveyer belt, requiring the bulk material to be further shredded or otherwise reduced in size before being loaded. Moreover, it is not uncommon to have irregularly shaped pieces of material to impact with the sidewalls of the container while being loaded. Such impacts can severely damage the sidewalls, which are generally very thin. Such impacts are especially common when loading HMS.

Another method to load bulk material into a freight container is to use a skid loader. When using a skid loader, the bulk material is carried into the container and then dumped in place. This method is also less than satisfactory. Errors in operation of the skid loader can lead to physical injuries to workmen, and can also easily damage the sidewalls and ceiling of the container. Also, only small skid loaders can be used because of the relatively small size of the containers in which they are to operate. The use of small skid loaders requires operators to make numerous trips between the bulk material pile and the freight container. Furthermore, because the skid loader operates by lifting its bucket and then dropping its load, it is impossible to load material above a certain height within the container, decreasing the effective utilization of the container.

U.S. Pat. No. 7,172,382 to Frankel ("Frankel"), discloses an additional method and apparatus for loading bulk material into a freight container. Frankel discloses a loading assembly including a support structure, a load bin having a cross section conforming to an open end of a container, and a drive mechanism configured to urge the load bin into and out of the container. When fully inserted, the contents of the load bin are disposed within the container. The loading assembly further includes a barrier configured to keep the load confined within the container while the load bin opens to allow the load to remain within the container upon retraction of the load bin. The barrier projects above the top of the load bin to follow the frame of the support structure, and is not inserted into the container. The device disclosed by Frankel is unsatisfactory, as it is overly complicated and expensive. It has numerous moving parts and drive mechanisms which are susceptible to failure, requiring costly repairs and decreasing loading efficiency.

Thus, better apparatuses and methods for loading bulk material into freight containers are needed.

BRIEF SUMMARY OF THE INVENTION

Accordingly, disclosed are apparatuses and methods for use thereof for loading bulk material into freight containers.

In one embodiment, an apparatus for loading material into a shipping container is disclosed. The apparatus comprises a hopper and a ram. The hopper is sized and shaped to receive the material and be at least partially enclosable by the container to occupy a substantial volume of the container. The hopper comprises a first end and a second, substantially open end positioned opposite the first end. The ram comprises a plate and a driver. The plate has a width less than an internal width of the hopper and a height that does not extend beyond a top of the hopper. The plate is configured to move between the first end and the open end of the hopper. The driver is configured and capable of moving the plate between the first end and the open end to load the material into the shipping container. Optionally, the driver comprises a hydraulic cylinder.

In another embodiment, the apparatus further comprises a stand mounted near the first end of the hopper. The stand is configured to support the hopper above the ground at a height approximately equivalent to the height of the container above the ground. Optionally, the stand remains stationary with respect to the hopper.

In one embodiment, the apparatus further includes collapsible legs configured to support the hopper above the ground at a height approximately equivalent to the height of the container above the ground when the collapsible legs are extended. In one embodiment, the collapsible legs are mounted to the hopper. In another embodiment, the collapsible legs are mounted to the ground. In one, embodiment, the collapsible legs are configured to collapse upon impact with the container. Optionally, the apparatus further comprises a hydraulic mechanism attached to the collapsible legs to collapse the legs prior to impacting the container. In another embodiment, the hopper comprises recesses for receiving the collapsible legs, thereby giving the hopper a flat bottom surface when the collapsible legs are collapsed.

A method of loading a shipping container with material is also disclosed. The method comprises: (a) providing a loader comprising a hopper with a first end and a second, substantially open end opposite the first end; (b) loading the material into the hopper; (c) partially enclosing at least a portion of the hopper within the container; and (d) pushing the material towards the open end while moving the container away from the hopper.

Optionally, the loader further comprises a hydraulic cylinder coupled to a plate positioned adjacent the material, and step (d) comprises operating the hydraulic cylinder to push the plate towards the open end. In another embodiment, the loader further comprises a walking floor including a plurality of slats and a drive mechanism supporting the material, and step (d) comprises operating the walking floor to push said material towards said open end.

In an embodiment, the loader comprises support legs and further comprises the step of extending the support legs to support said hopper.

In one embodiment, the container is attached to a flatbed tractor-trailer.

Optionally, step (c) comprises: positioning the container in front of the hopper; moving the container backwards towards the hopper; and enclosing at least a portion of the hopper in the container.

In one embodiment, the material is pushed towards the open end at a predetermined speed and the container is moved away from the hopper at approximately the same speed.

In yet another embodiment, the support legs are collapsed upon impact with the container. In another embodiment, the support legs are collapsed prior to being impacted by the container.

In an additional embodiment, step (d) comprises putting the flatbed tractor-trailer in neutral, thereby causing the material to push the flatbed tractor-trailer forward. In another embodiment, step (d) comprises driving the flatbed tractor-trailer forward.

A hopper for loading material into a shipping container is also disclosed. The hopper comprises: a first end; a second, substantially open end positioned opposite the first end; and a reciprocating conveyor floor system extending from the first end to the second end. The reciprocating conveyor floor comprises a plurality of horizontal slats and a drive mechanism configured to move groups of slats in an alternating manner. The hopper is sized and shaped to be at least partially enclosable by the container to occupy a substantial volume of the container.

BRIEF DESCRIPTION OF THE DRAWINGS

For a more complete understanding of the present invention, the objects and advantages thereof, reference is now made to the following descriptions taken in connection with the accompanying drawing in which.

DETAILED DESCRIPTION OF THE INVENTION

Figure 1:
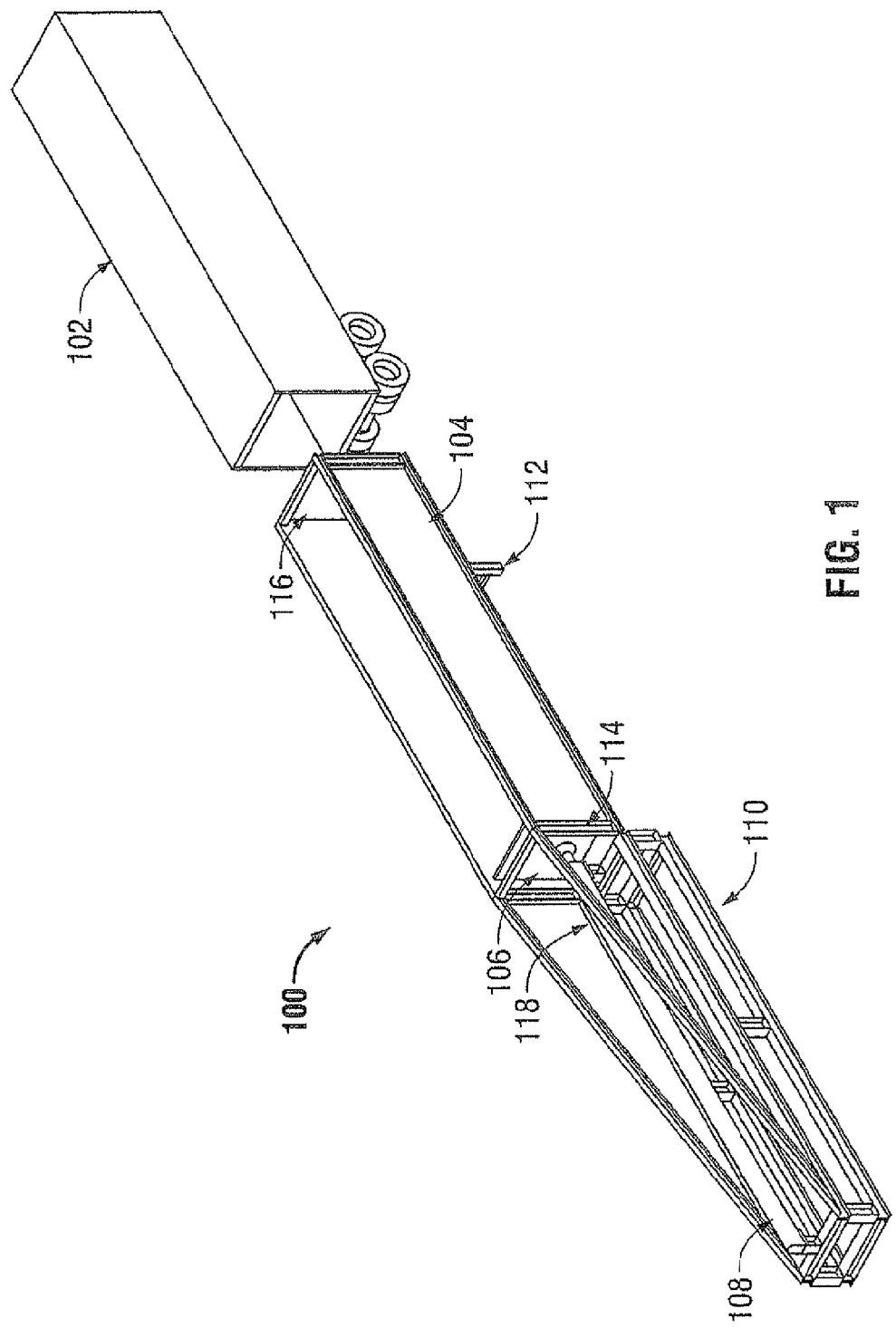
FIG. 1 illustrates a container and a bulk material loader, according to an embodiment of the invention, for use therewith.
Figure 2:
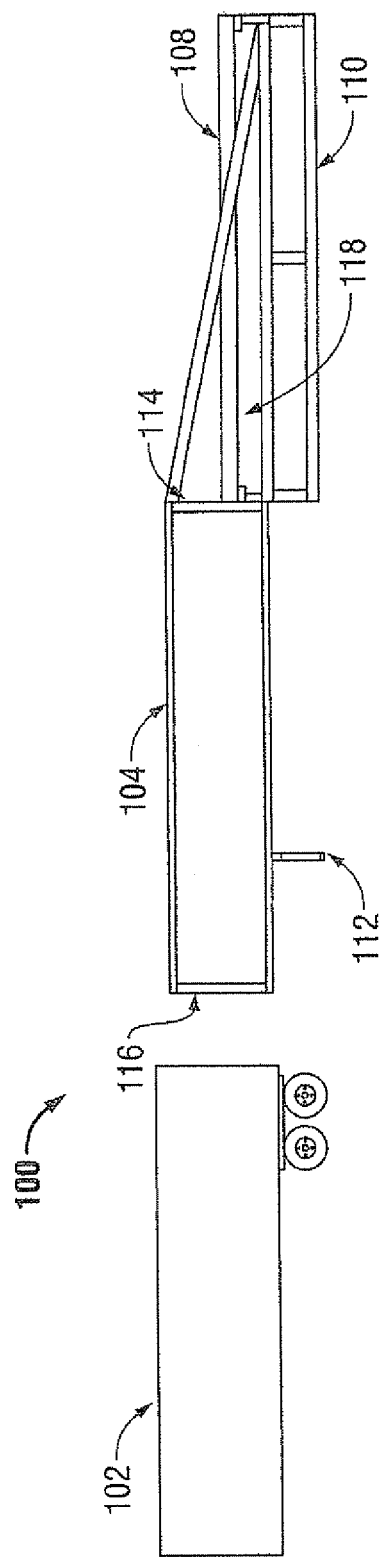
FIG. 2 illustrates a side view of the container and the bulk material loader of FIG. 1.
Figure 3:
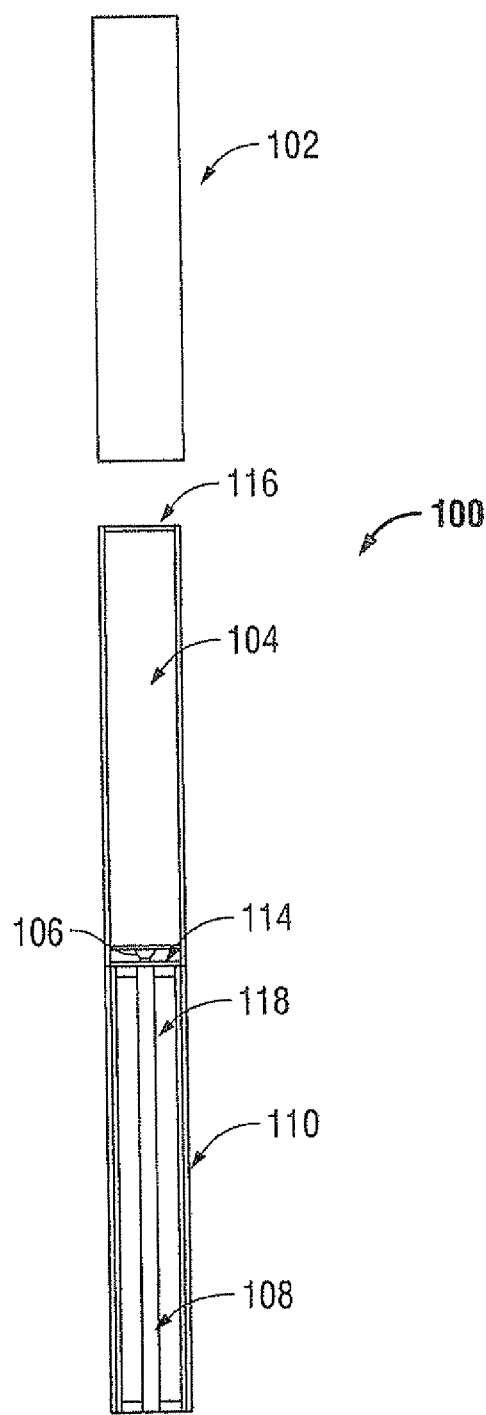
FIG. 3 illustrates a top view of the container and the bulk material loader of FIG. 1.

Referring to FIG. 1, depicted is a bulk material loader 100, according to an embodiment of the invention, and a container 102 mounted on a flatbed tractor-trailer (only the rear wheels of the flatbed tractor-trailer are shown). In one embodiment, the container 102 is a standard sized container used in the freight industry, and can be a standard 40', the 40' high-cube, the standard 20', or another common sized container. The bulk material loader 100 comprises a hopper 104. The hopper 104 is suitable to withstand the loading and unloading of bulk material, including HMS, without being damaged. In one embodiment, the hopper 104 is constructed to support and withstand loads in excess of 66,000 pounds, although the loader of the present invention can be constructed to load materials of less than or greater than 60,000 pounds. Referring briefly to FIG. 2 and FIG. 3, it is apparent that the height and width of the hopper 104 is less than, and preferably slightly less than, the internal height and width of the container 102. Accordingly, as depicted in FIG. 5, the hopper 104 can be at least partially enclosed by the container 102. The exact height and width of the hopper 104 will depend on its specific application, but in one embodiment, the hopper 104 is slightly less than 7' 8" tall and slightly less than 7' 7" wide, thereby permitting the hopper 104 to fit within most ISO containers. The length of the hopper 104 will also depend on its specific application. In one embodiment, the hopper 104 is at least 40' long, thereby permitting the hopper 104 to occupy substantially the entire volume of most standard sized containers, as depicted in FIG. 5. The hopper 104 comprises an open end 116 to permit bulk material to be expelled from the hopper 104 into the container 102. In some embodiments, and as illustrated in FIG. 1, the hopper 104 further comprises, for example, a steel frame supporting a steel bottom and two steel sides. In other embodiments, as illustrated in FIG. 4, the hopper 104 comprises, for example, a steel frame supporting a reciprocating conveyor floor system 400 and two steel sides.

Figure 4:
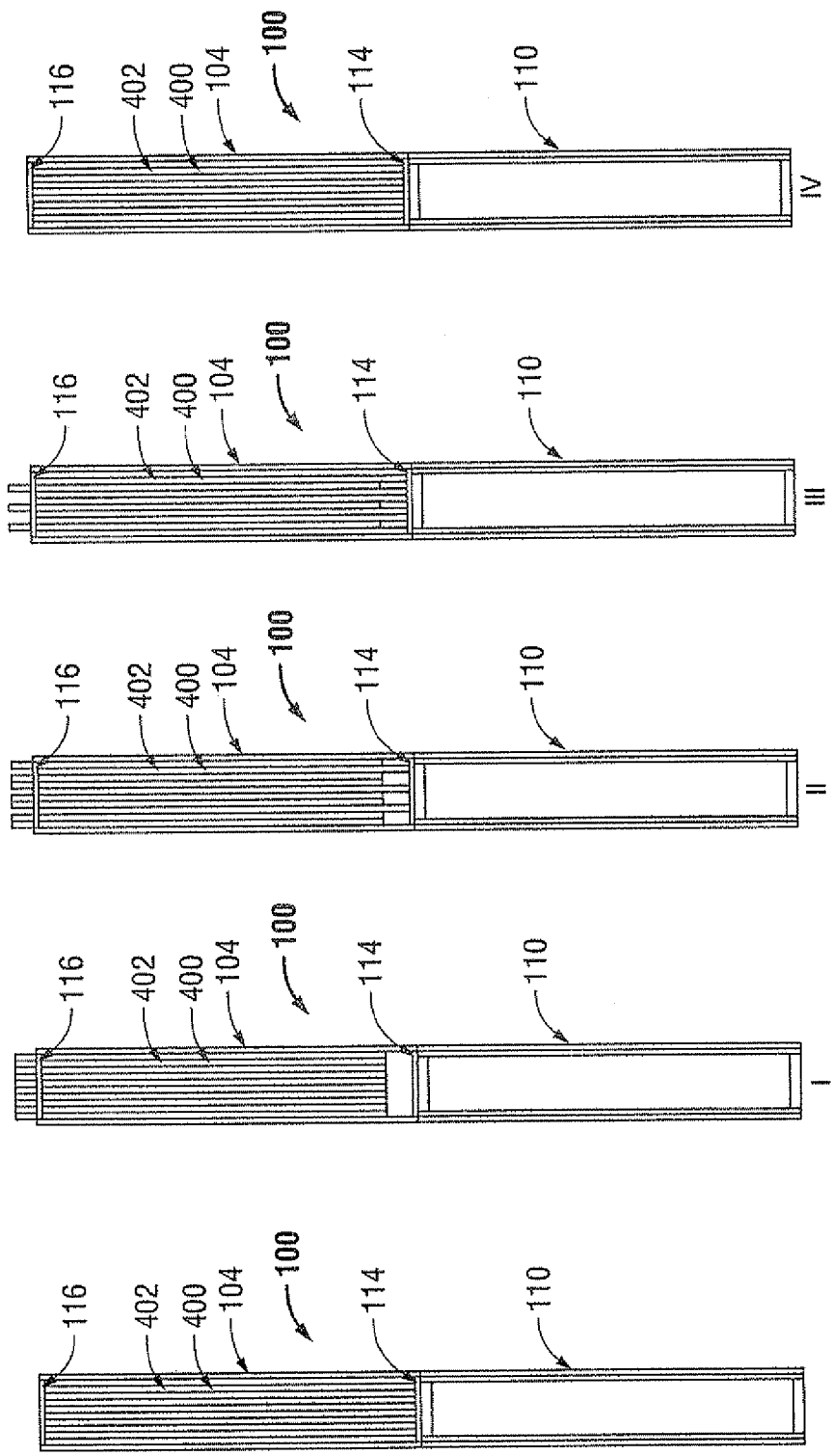
FIG. 4 illustrates top views of a bulk material loader with a reciprocating conveyor floor system, according to an embodiment of the invention, for use therewith.
Figure 5:
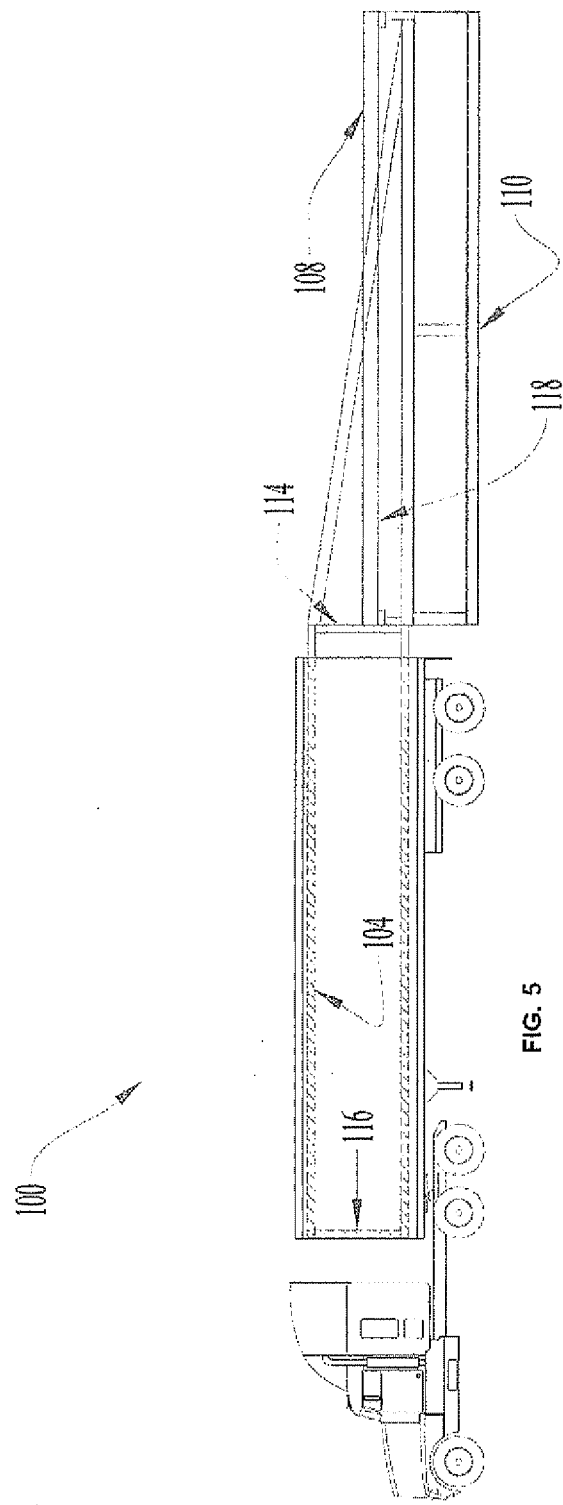
FIG. 5 illustrates a side view of the container and the bulk material loader when the bulk material loader is inserted into the container, according to an embodiment.

Referring now to FIG. 4, the reciprocating conveyor floor system 400, also known as a walking floor, is well known to those skilled in the art, and extends from a back end 114 to the open end 116 of the hopper 104. The floor system 400 comprises a plurality of horizontal floor slats 402 and at least one drive mechanism (not shown), typically mounted below the slats 402, configured to move groups of slats in an alternating manner. In one embodiment, every third slat is a member of the same group and is moved in unison, and the floor system 400 operates in a four step process. In Step I, all three groups of floor slats 402' are extended out through the open end 116 of the hopper 104 approximately the same distance. This motion causes all the bulk material loaded in the hopper 104 to be pushed slightly forward towards the open end 116 of the hopper 104. The bulk material closest to the open end 116 of the hopper 104 is moved through the open end 116 and out of the hopper 104 while still being supported by the floor system 400. In Step II, the first group of floor slats 402 of the floor system 400 is retracted into the hopper 104 to its original position. During this retraction, the first group of floor slats 402 changes its position relative to all of the bulk material supported by the floor system 400. The bulk material external to the hopper 104 remains supported by the second and third group of floor slats 402. In Step III, the second group of floor slats 402 is retracted into the hopper 104 to its original position. Again, this retraction causes the second group of floor slats 402 to change its position relative to the bulk material supported by the floor system 400. At this point, the bulk material external to the hopper 104 is supported only by the third group of floor slats 402. Finally, in Step IV, the third group of floor slats 402 is retracted into the hopper 104 to its original position. This last retraction causes the third group of floor slats 402 to change its position relative to all of the bulk material, and causes the bulk material external to the hopper 104 to no longer be supported by the floor system 400. As a result, this external bulk material is expelled into the standard container (not shown). Steps I-IV are repeated until all of the bulk material has been unloaded from the hopper 104.

Referring back to FIG. 1, the bulk material loader 100, in some embodiments, further comprises a ram 118. The ram 118 comprises a plate 106 and a driver 108. In one embodiment, the plate 106 is sized to fit snuggly to the bottom and sides of the hopper 104. In a preferred embodiment, the plate 106 is made of a heavy duty steel material. In an embodiment, the plate 106 blocks the back end 114 of the hopper 104 to prevent bulk material from accidentally being expelled from the hopper 104. The plate 106 is attached to the driver 108. The driver 108 is a mechanical device configured to move the plate 106 between the back end 114 and the open end 116 of the hopper 104 to load material into the container 102. In an embodiment of the invention, the driver 108 is capable of moving at least 22,000 pounds. In another embodiment, the driver 108 is capable of moving at least 58,000 pounds.

In an embodiment of the invention, as depicted in FIG. 1, the driver 108 is a hydraulic cylinder. In this embodiment, the plate 106 is attached to the hydraulic cylinder's adjustable piston rod. Thus, when the piston rod of the driver 108 is extended, the plate 106 is pushed from the back end 114 of the hopper 104 to the front open end 116 of the hopper 104. The hydraulic cylinder is any standard hydraulic cylinder, well known to those skilled in the art, capable of pushing scrap metal or similar bulk material out of hopper 104. As is apparent to those skilled in the art, the hydraulic cylinder is part of a hydraulic system (not shown), the main components of which are a hydraulic pump, a hydraulic cylinder, and a series of electrical controls. When the driver 108 is a hydraulic cylinder, the length of the hydraulic cylinder varies based on the length of hopper 104. In one embodiment, as most clearly depicted in FIG. 2 and FIG. 3, the hydraulic cylinder is long enough to adjust the position of the plate 106 from the back end 114 of the hopper 104 to the front open end 116 of the hopper 104.

Those skilled in the art will recognize that the driver 108 need not be a hydraulic cylinder, and can be any mechanical device(s) capable of moving the plate 106 between the back end 114 and the open end 116 of the hopper 104. Thus, in one embodiment, the driver 108 comprises a chain or belt drive (not shown) connected to the plate 106. In another embodiment, the driver 108 comprises a rack and pinion setup (not shown), where the pinion is connected to a motor to drive the rack forward and or backward. The pinion is connected to the plate 106 to move the plate 106 between the back end 114 and the open end 116 of the hopper 104. In yet another embodiment, driver 108 is a screw system (not shown) designed to move the plate 106 between the back end 114 and the open end 116 of the hopper 104. All of these configurations including their operations are well known to those skilled in the art.

In another embodiment, the bulk material loader 100 further comprises a stand 110 onto which the hopper 104 is mounted. In one embodiment, most clearly depicted in FIG. 2, the hopper 104 is mounted to the stand 110 such that hopper 104 is off the ground and positioned at approximately the same height as the container 102. In this way, the hopper 104 can easily be partially enclosed by the container 102 without having to alter the distance between the ground and the container 102 or the hopper 104. As will be apparent, the exact height of the hopper 104 off the ground will depend on the specific application. In one embodiment, the hopper 104 is mounted to the stand 110 such that the hopper 104 is approximately 5' off the ground. In another embodiment, the hopper 104 is mounted such that it is between approximately 3' 2" and 3' 4" off the ground. The stand 110 is made from heavy duty steel and, in some embodiments, is capable of supporting the entire weight of the loaded hopper 104, thereby preventing the bulk material loader 100 from tipping over or otherwise being damaged. In one embodiment, the stand 110 is counterbalanced with concrete blocks or a similar material (not shown) to enable the stand 110 to support the weight of the hopper 104. All or part of the driver 108 can also be mounted to the stand 110 as necessary, depending on the specific implementation of the driver 108. Thus, when the driver 108 is a hydraulic cylinder, as depicted in FIG. 1, the driver 108 is mounted to the stand 110.

Referring to FIG. 1 and FIG. 2, in another embodiment, the bulk material loader 100 also comprises collapsible support legs 112. These support legs 112 prevent the bulk material loader 100 from tipping over under heavy loads and allow the hopper 104 to be loaded quicker in high volume operations. The support legs 112 collapse towards the stand 110, thereby enabling portions of the hopper 104 beyond the point of the support legs 112 to occupy space within the container 102. Once the support legs 112 have collapsed, any necessary support is provided by the container 102 and flatbed. In one embodiment, the support legs 112 are hingedly mounted to the bottom of the hopper 104. In a more detailed embodiment, the bottom of the hopper 104 has recesses configured to receive the collapsed support legs 112. In this embodiment, when the support legs 112 collapse they are received in complimentary recesses, giving the hopper 104 a flat bottom and preventing the support legs 112 from protruding beyond the bottom of the hopper 104 when collapsed. Thus, the support legs 112 are protected from damage when collapsed, and weight not supported by the stand 110 is transferred through the entire portion of the hopper 104 inside the container 102 to the container 102 and flatbed. In one embodiment, the bottom of the hopper 104 includes multiple rollers to facilitate the movement of the container 102 relative to the hopper 104. In another embodiment, the collapsible support legs 112 are hingedly mounted to the ground. In this embodiment, the usable space of the hopper 104 is increased because clearance for the support legs 112 inside the container 102 is no longer required. For example, the legs 112 can be mounted to a foundation provided on the ground with a hydraulic line connected to it.

In accordance with an embodiment of the invention, operation of the bulk material loader 100 proceeds as follows. First, the length of the container 102 must be determined to set the position of the piston rod of the driver 108 and thus the position of the plate 106 in the hopper 104. For instance, if the container 102 is a standard 20', then only 20' of the hopper 104 or less can be used to occupy space within the container 102.

For example, in this case, the piston rod of the hopper 104 must be set so that the plate 106 is 20' from the front opening of the hopper 104. If, on the other hand, the container 102 is a standard 40' and the hopper 104 is 40' long, then the piston rod must be fully retracted so that the plate 106 is at the back end 114 of the hopper 104. Once the plate 106 is set in position, and the support legs 112 are extended (if necessary), the bulk material is loaded into the hopper 104. Any type of material can be loaded, including HMS over 6' in length. In one embodiment, the bulk material is dumped into the hopper 104 through the open top of the hopper 104. Once the hopper 104 is loaded, the container 102, still attached to the flatbed tractor-trailer, is positioned in front of the hopper 104 and is backed up to enclose the hopper 104 within the container 102. If the support legs 112 are extended, they collapse when impacted by the container 102. Alternatively, the support legs 112 are set to collapse prior to being impacted by the container 102. As a result of the flatbed tractor-trailer backing up, the hopper 104 is at least partially enclosed by the container 102, one embodiment of which is illustrated in FIG. 5. At this point, the hydraulic system is activated to push the piston rod of driver 108 forward. The piston rod pushes the plate 106, which in turn pushes the bulk material out of the front opening of the hopper 104 and into the container 102. As bulk material is pushed into container 102, the flatbed tractor-trailer moves forward so as to fill the container 102 with all of the material in the hopper 104. In one embodiment, at the same time the hydraulic system is activated, the flatbed tractor-trailer is set to neutral. As a result of the bulk material being pushed into the container 102, the flatbed tractor-trailer is pushed forward. In another embodiment, when the hydraulic system is activated, the flatbed tractor-trailer is slowly driven forward at approximately the same speed the hydraulic piston is pushing the plate 106. In this manner, when the hydraulic piston of the driver 108 is fully extended, all of the bulk material that was in the hopper 104 is pushed into the container 102. Once all of the material is loaded in the container 102, the flatbed tractor-trailer pulls forward, the container 102 doors are closed, and the flatbed tractor-trailer drives away.

Referring now to FIG. 1, embodiments of the invention have several advantages over the prior art. For instance, the bottom and side walls of the hopper 104 prevent the container 102 from coming into contact with the bulk material when the bulk material is moving with respect to the container 102. Thus, at no point can the container 102 suffer damage from the bulk material. Furthermore, the bulk material loader 100 has few moving parts. In one embodiment, only the driver 108 and the plate 106 move, leading to less wear and tear on the loader 100, and less chance for damage and costly repairs. In another embodiment, the bulk material loader 100 utilizes a readily available reciprocating conveyor floor system (not shown), reducing costs and deployment time. Also, in some embodiments, a flatbed tractor-trailer engine is used in the loading process to reduce the amount of work to be done by the bulk material loader 100, again reducing costs and the likelihood of failures.

While in accordance with the patent statutes, description of the various embodiments and examples have been provided, the scope of the invention is not to be limited thereto or thereby. Modifications and alterations of the present invention will be apparent to those skilled in the art without departing from the scope and spirit of the present invention.

Therefore, it will be appreciated that the scope of this invention is to be defined by the appended claims, rather than by the specific examples which have been presented by way of example.

We claim:

1. An apparatus for loading metal scrap material into an ISO standard-compliant shipping container having an internal width [of 7' 7¾"], an internal height and an external length and defining a volume, the apparatus comprising:
    a hopper for receiving the metal scrap material, the hopper comprising a bottom having an external width slightly less than the internal width of the ISO standard-compliant shipping container and opposing side walls having an internal height slightly less than the internal height of said ISO standard-compliant shipping container, and the bottom having a length at least as long as the external length of said ISO standard-compliant shipping container, said hopper comprising a first end and a second end positioned opposite said first end, wherein said hopper has an open top extending between said first end and second end and said hopper is fixed in position and oriented so as to enable the ISO standard-compliant shipping container to be moved into engagement with said hopper to thereby receive said hopper therein to extend along the entire length of the ISO standard-compliant shipping container;
    a plate disposed within said hopper having a width just less than an internal width of said hopper, and configured to move between said first end and said second end of said hopper; and
    a driver configured for moving said plate between said first end and said second end to shift said heavy metal scrap material out of said hopper.

2. The apparatus of claim 1, wherein said driver comprises a hydraulic cylinder.

3. The apparatus of claim 1, further comprising a stand mounted near said first end of said hopper configured to support said hopper above the ground at a height approximately equivalent to the height of said ISO standard-compliant shipping container above the ground.

4. The apparatus of claim 1, wherein said plate is positionable between said first end and said second end of said hopper to define a portion of said hopper to receive the heavy metal scrap material.

5. The apparatus of claim 4, wherein the portion defines a volume, and the volume of said portion is determined based upon the volume of said ISO standard-compliant shipping container to be filled with said metal scrap material.

6. The apparatus of claim 4, wherein said plate pushes the metal scrap material contained in said portion into said ISO standard-compliant shipping container.

7. The apparatus of claim 4, wherein the position of said plate is determined based upon the volume of said ISO standard-compliant shipping container to be filled with the metal scrap material.

8. The apparatus of claim 4, wherein said hopper is capable of occupying less than the entire volume of said ISO standard-compliant shipping container.

9. The apparatus of claim 1 wherein the driver comprises a chain drive connected to the plate.

10. The apparatus of claim 1 wherein the driver comprises a belt drive connected to the plate.

11. The apparatus of claim 1 wherein the driver comprises a rack and pinion setup, wherein the pinion is connected to a motor and to the plate to move the plate.

12. The apparatus of claim 1 wherein the driver comprises a screw system to move the plate.

13. The apparatus of claim 1 wherein the driver comprises a cable and winch system, wherein the cable routed is to the plate via pulleys.

* * * * *